Nov. 23, 1943.　　　　J. T. ZAK　　　　2,334,739
SIGHTING INSTRUMENT
Filed Sept. 2, 1942　　　　4 Sheets-Sheet 1
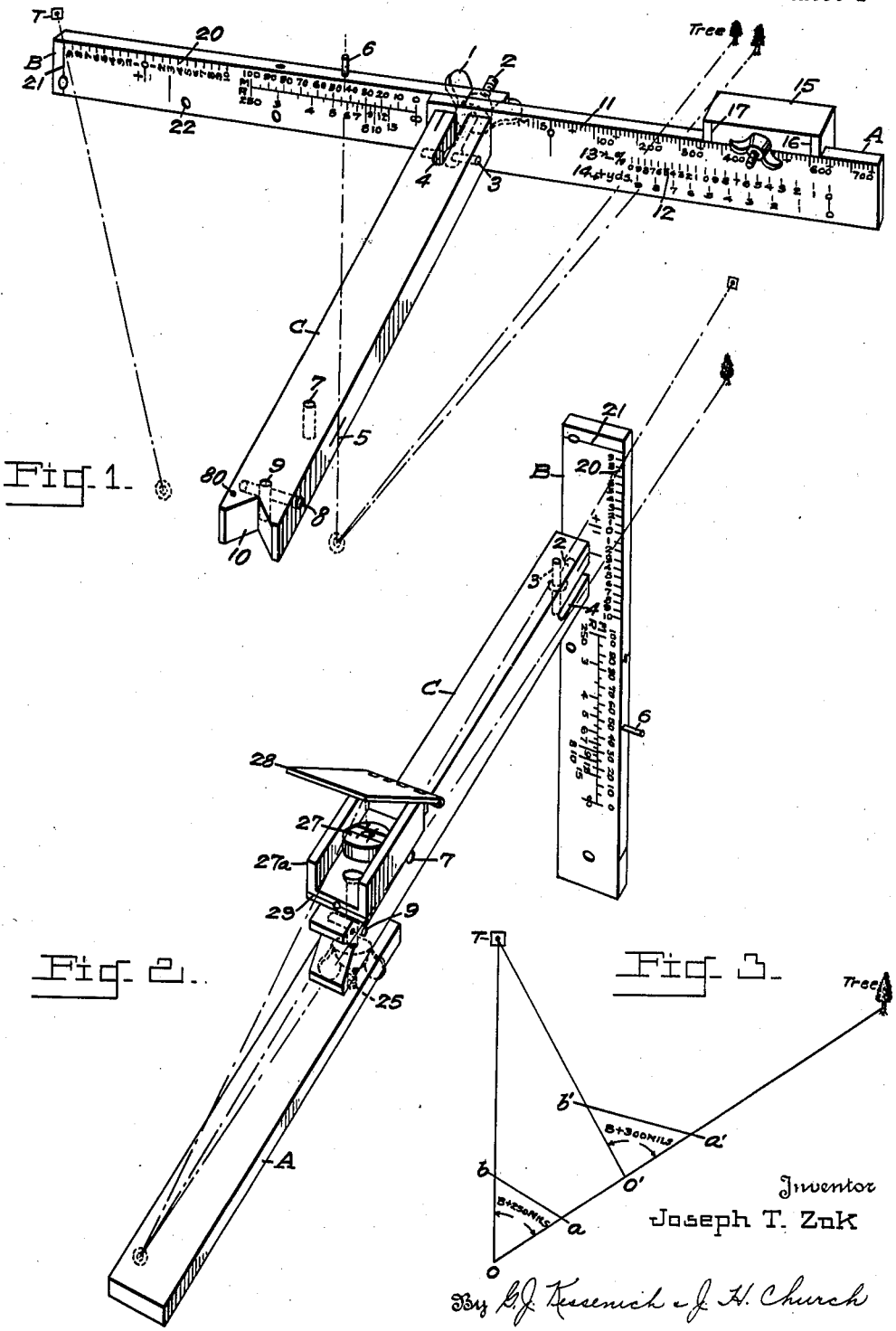
Inventor
Joseph T. Zak
By G. J. Kessenich & J. H. Church
Attorneys Nov. 23, 1943.                    J. T. ZAK                    2,334,739
                            SIGHTING INSTRUMENT
                           Filed Sept. 2, 1942                 4 Sheets-Sheet 2

Inventor
Joseph T. Zak

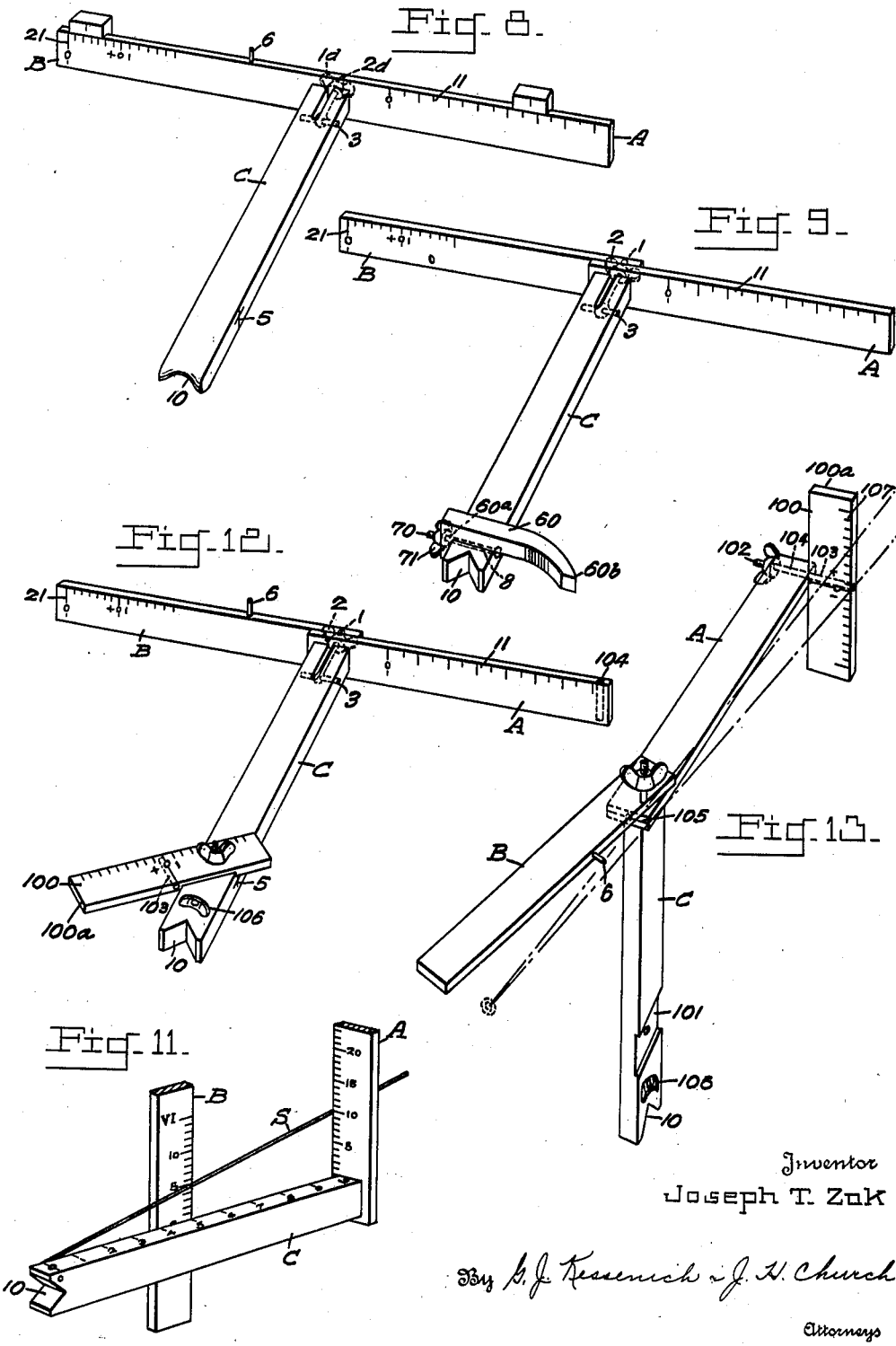

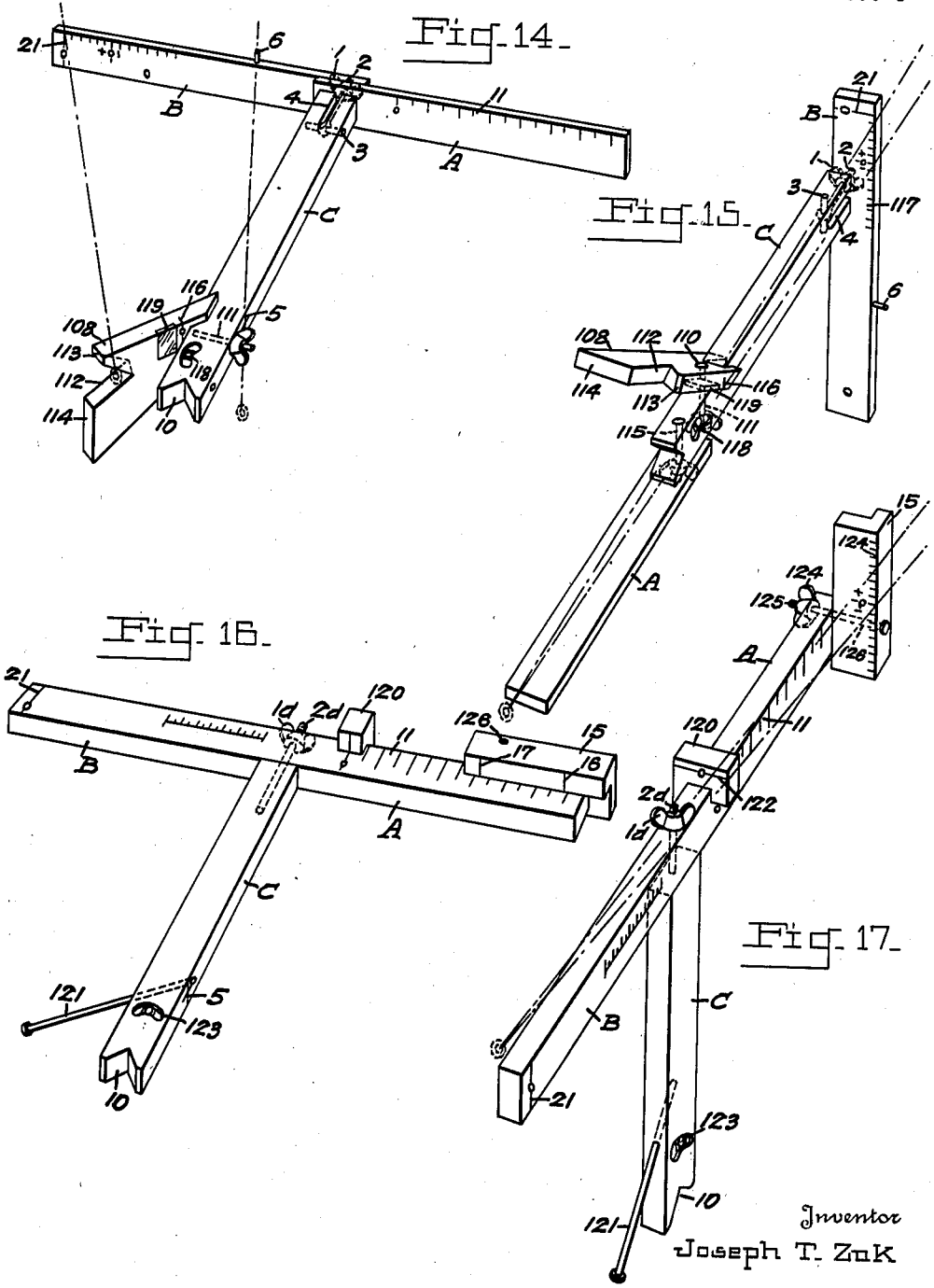

Patented Nov. 23, 1943

2,334,739

UNITED STATES PATENT OFFICE 2,334,739

SIGHTING INSTRUMENT

Joseph T. Zak, United States Army, Aurora, Ill.

Application September 2, 1942, Serial No. 456,980

12 Claims. (Cl. 33—64)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an instrument adapted to be used for range measurement, horizontal angle measurement, angle of site measurement, and/or magnetic azimuth measurement.

This invention to a certain extent relates to an improvement in the instrument of the type disclosed in my U. S. Patent 2,048,722, issued July 28, 1936; a magnetic azimuth finder is incorporated in the instrument and the improvements are of such a nature as to make this instrument closely approach the effectiveness of precision instruments with lenses.

An object of this invention is to provide an instrument of the above character which is adapted to be easily and quickly operated to any position for determining the range, horizontal angle, angle of site and magnetic azimuth to meet the conditions of direct and indirect laying (overhead fire) with a machine gun or the like.

Another object of this invention is to provide a range finding, horizontal angle measuring, magnetic azimuth measuring, and angle of site instrument which is simple in construction, efficient in use, light in weight, and which is not apt to get out of order.

The specific nature of the invention as well as other objects and advantages thereof will clearly appear from a description of a preferred embodiment as shown in the accompanying drawings in which:

Fig. 1 discloses an instrument assembled for range finding and horizontal angle measurements.

Fig. 2 discloses the same instrument reassembled and having means thereon for obtaining angle of site readings.

Fig. 3 is helpful in explaining the manner in which a range reading is obtained.

Fig. 4 discloses the same instrument of Fig. 1 reassembled and having means thereon for obtaining magnetic azimuths.

Figs. 5, 6, 6a, 7 and 8 are modified arrangements for clamping arms A, B, C of the instrument in Fig. 1. In addition, Fig. 7 discloses steadying means on arm C.

Fig. 9 discloses an improved steadying device mounted on arm C.

Fig. 10 discloses the manner in which the instrument of Fig. 1 may be employed as a protractor in conjunction with maps or drawings.

Fig. 11 discloses the manner in which the instrument of Fig. 1 may be employed to determine one of the three quantities, angle of site, range, vertical distance, when any two of those quantities are known or have been determined by the instrument of Figs. 1 and 2.

Figs. 12 and 14 disclose a modified steadying device on the instrument of Fig. 1 and Figs. 13, 15, respectively, disclose said steadying device in use when an instrument of the type shown in Fig. 1 is used as an angle of site measuring instrument.

Figs. 16, 17 disclose a modified combined range finding and angle of site measuring instrument which is characterized by its ruggedness, simplicity and economy of manufacture.

The instrument of Fig. 1 consists essentially of a trio of arms A, B, C having suitable scales thereon and assembly and mounting holes therein. The arms A, B, C are preferably made of wood but it is obvious that other material may be substituted for the wood. It is apparent from Fig. 1 that the arms A, B, C will always be in angular adjustment with one another and arms A and B will be at a constant distance from the operator's nose engaging portion 10. Arms A, B, C are held in spaced relationship to one another by means of bolt 2 having wing nut or similar clamping means 1 thereon. Bolt 2 is pivotably mounted on arm C by means of a pin 3 which passes through a hole in the end of bolt 2 and which is frictionally held in the arm C. Slot 4 in the forward end of arm C is made large enough so as to allow at least a ninety degree pivotal movement of arm C when wing nut 1 is released whereby the instrument may in its carrying position be compactly folded to a substantially rectangular block having a length substantially equal to the length of one of the arms and a thickness which is substantially three times the thickness of one of the arms.

Range finding

The method employed in determining the range to a target is similar to that described in my above mentioned Patent 2,048,722, issued July 28, 1936. Reference will be had to the graphic representation in Fig. 3 wherein the line OO' represents a fixed known distance and termed the base line. At position O, the observer places notch 10 against the ridge of his nose with his left hand supporting the instrument and his right hand free. The observer aligns the center line of mark 5 on the right hand side of arm C with a projecting peg or nail 6 on arm B and maintaining this alignment he turns his body until the target and left index line 21 on arm B coincide. He then selects a convenient reference object such as a tree and slides the adjustable slide 15 with his right hand until mark 16 on slide 15 coincides with the tree. Thus an indication of angle T—0—tree is obtained from readings, a, b on respective arms A, B of the instrument. A known distance is stepped out along the line 0—tree to point 0' which defines the end of the base line. The operator then repeats the sighting procedure outlined above whereby an indication as to angle T—0'—tree is obtained by corresponding readings a', b' on respective arms A, B of the instrument. It is noted that all sighting over arm A is accomplished with the right eye and all sighting over line 21 on B is accomplished with the left eye. Also, it is noted that if the reference mark and target are transposed an indication of the above angles may be similarly obtained by laying line 21 on the reference object and sliding mark 16 to coincide with the target.

A varnished linen string provides a good means for determining the base line distance 00'; but, if an assistant is present the instrument itself may, by changing it to an angle of sight instrument in a manner to be described below, be used for that purpose. In that case the observer directs the assistant at 0 to face in the direction of 0' and to have extended in his outstretched arms a string of computed length. The observer who is on the line extending from 0 to the reference point and in the vicinity of 0' notes the angle in mils subtended by the string which is held at 0 and hence may determine the exact distance from 0 to the point 0' where he made the angle of sight measurements. A correction will have to be applied to the angular readings obtained on scale 11 in an amount determined by the deviation of the exact distance 0—0' from a predetermined distance which was the basis for the calibration of scale 11. These corrections in percent may be conveniently placed on arm A at 13 and the corresponding mil or distance (as in this instance) correction at 14. These corrections may be obtained by using the following formula: RM equals 1000W where R is the range, M the angular width in mils of the target or base line, and W the lineal width of the target or base line. For the sake of accuracy, the base line length should be made longer as the range to be measured is increased.

It is apparent that scales similar to the ones disclosed in my above mentioned Patent 2,048,722 may be placed on arms A and B if an adjustable slide similar to slide 15 is placed on arm B as well as on arm A. In this arrangement disclosed herein there is only one adjustable slide so therefore the instrument may be calibrated directly and resort need not be made to a correction scale similar to scale 2 in my Patent 2,048,722.

Reading horizontal angles

The observer places notch 10 on the ridge of his nose and between his eyes; he supports the instrument and moves the slide 15 as in the above range finding operation. During every reading the instrument must be held at such an angle with the head that the right eye will always be in position to see the nail or peg 6 on arm B over the vertical bar of cross 5 on the right side of arm C. An indication as to the angle subtended is obtained from scale 12.

Reading angles of site

In order to read angles of site the arms A, B, C are arranged as in Figure 2 and a level 27 and its housing 27a which hingedly carries mirror 28 is bolted to arm C by means of auxiliary common clamping bolt 25 passing through auxiliary hole 8 in member C.

The observer in this arrangement lines up a mark 29 on the level housing 27a with the zero mark of scale 20 on arm B and with a distant reference point and at the same time moves the instrument until the bubble in the conventional spirit level 27 stands in its level position; the observer then tilts his head slightly maintaining the bubble in level position and determines where his line of vision to the distant target intersects the scale 20. The point of intersection of course gives an indication of the angular elevation of the target.

During the above sighting operations the end of arm A rests on the observer's cheek below and slightly to the left of his right eye.

Reading magnetic azimuths

In order to read magnetic azimuths the arms A, B, C are arranged as in Figure 4 and a magnetic compass needle 38 has its housing 37 clamped to arm C by means of thumb screw 33 and bolt 32 which is carried by housing 37 and which extends through auxiliary hole 7 (Fig. 1) in arm C; also auxiliary thumb screw 30 on auxiliary bolt 31 which passes through auxiliary hole 9 (Fig. 1) serves to clamp arms A and C together.

Compass housing 37 carries the bridge member 35 having a centrally disposed wire 36 which is aligned with the zero mark of scale 51 on arm B in the above assembly.

The observer resting the cheek under his right eye on the end of arm A sights along the instrument and aligns the slit 40 in mirrored member 39 with wire 36, at the same time moving the instrument until the mirror image of the south pole end of the magnet is equidistant between abutments 41—41. The rear side of sighting member 39 is mirrored and placed at such an angle that the observer from his sighting position readily sees the south end of the magnet. When the above position of the instrument is obtained the observer then with the same eye sights on the target and notes the intersection of his line of sight with the scale (Fig. 4) on the instrument. That scale may be calibrated in mils so that the deviation of the observer-target line from the magnetic north position may be determined directly.

Fig. 5 discloses another way in which arms A, B, C in Fig. 1 may be clamped together. In this instance bolt 2a is fixedly mounted in the end of C and projects through holes in arms A and B and carries thereon clamping nut 1a.

Fig. 6 discloses another way in which arms A, B, C in Fig. 1 may be clamped together. In this instance the arm C has a rectangular cut-out portion which receives the ends of arms A and B in such a manner that contiguous surfaces of the arms are flush with one another. Clamping bolt 2b is anchored in arm C and projects through holes in A and B and carries clamping nut 1b.

If so desired, the arms A and B may be secured in the end of arm C by a full mortise (Fig. 6a) by means of screw 2b' and nut 1b' instead of in a groove in the end of arm C as in Fig. 6.

Fig. 7 discloses a modification of the arrangement shown in Fig. 1. In this instance clamping bolt $2c$ anchored in arm A passes through a hole in arm B, and through projection $C_1$ on arm C and carries clamping nut $1c$. Oppositely disposed members 50, 51 clamped on arm C are adapted to rest on the observer's forehead and cheeks and thus provide a means for steadying the instrument during the sighting operation.

Fig. 8 discloses another manner in which arms A, B, C in Fig. 1 may be clamped together. In this instance arms A and B are made integral with one another and a clamping bolt $2d$ anchored in arm C carrying clamping nut $1d$ serves to hold the arms A, B, C together.

Fig. 9 discloses a steadying device 60 mounted on the arm C for use during range determinations. The steadying device 60 has a right angle cut-out portion adapted to have inserted therein one of the right angles of arm C. A clamping bolt 70 passing through hole 8 (Fig. 1) in arm C and hole $60a$ in the steadying device carries clamping nut 71. The curved end $60b$ of the steadying device is pressed against the observer's forehead above his right eye while notch 10 rests on the ridge of his nose thereby preventing slippage. With this steadying device 60 in place on the arrangement shown in Fig. 1 the aligning marks 5, 6 (Fig. 1) are found unnecessary because the steadying device 60 serves to keep the arm C at a constant angle with the observer's eye.

Fig. 10 discloses the manner in which arms A and C of the arrangement shown in Fig. 1 may be used to measure angles or as a protractor. The arm C and arm A which has the mil scale 11 thereon is arranged as in Fig. 10 with the mil scale facing inwardly. A common straight pin is inserted through pin hole 80 in arm C and through the reference point Z on the map or drawing under consideration. Pencil rays are drawn through points X, Y on the map and through point Z. Angular distances are read on the mil scale directly; in this instance, the angle subtended is 300 mils.

Fig. 11 discloses the manner in which the vertical interval or vertical distance of a distant object may be determined knowing its range and the angle subtended thereby. This particular arrangement disclosed in this figure serves to teach the manner in which the length of the base line 0—0' in Fig. 1 may be determined when as recited under "Range finding" an assistant holds a known length of string. The arms A, B, C of Fig. 1 are arranged as shown in Fig. 11. The arm B is not attached to arm A or arm C but is movable by the operator. A string S is tacked at the zero point of the range scale on arm C and drawn taut by the observer's hand so as to intercept the mil scale on arm A at a known or unknown value. The zero mark of the vertical interval scale (in lineal dimensions) on arm B is made to coincide with the known or unknown range and the intersection of the string S with scale on arm B will determine the corresponding vertical interval. It is obvious from principles of geometry that knowing any two of the three quantities, range, subtended angular distance, or vertical interval of the distant object, the remaining third quantity may be determined by the means disclosed in conjunction with Fig. 11.

Fig. 12 discloses another steadying device which may be placed on the instrument of Fig. 1; Figure 13 discloses the steadying device of Fig. 12 in an angle of sight measuring arrangement. The steadying brace 100 is clamped in the groove 101 (Fig. 13) in arm C in range finding and horizontal angle measuring arrangements. The end $100a$ of brace 100 is braced on the observer's face above his left eye and notch 10 rests on the ridge of his nose. In the angle of sight arrangement in Fig. 13 the brace 100 is mounted on arm A with clamping bolt 102 passing through hole 103 (Fig. 13) in the brace 100 and through hole 104 in arm A. The instrument in Fig. 13 is aligned by aligning zero mark 105 on the end of arm A with the zero mark of the angle of sight scale on brace 100 and simultaneously bodily moving the instrument until the bubble in spirit level 106 stands in level position. The observer then sights on the distant target and notes the point on scale 107 where his line of vision intersects the angle of sight scale. It is noted that in the arrangement in Fig. 13 no mirror is necessary to see the bubble in spirit level 106.

In this particular arrangement the brace 100 has the angle of sight scale thereon and if desired the slide 15 of Fig. 1 could have an angle of sight scale thereon so as to serve the same purpose of brace 100 in Fig. 13. This will be more apparent later.

Fig. 14 discloses another steadying device which may be placed on the instrument of Fig. 1 and Fig. 15 discloses said steadying device in an angle of sight measuring arrangement. The steadying device 108 is clamped to arm C at an angle of approximately forty-five degrees with the axis of arm C by means of the bolt 109 passing through the steadying device hole 110 and hole 111 in arm C. The steadying device has a V notch 112 for sighting purposes which separates the brace surfaces 113 and 114 on the steadying device. Surface 113 is adapted to rest on the observer's forehead above his left eye and surface 114 is adapted to rest against the cheek below his left eye. Those two surfaces together with notch 10 which rests on the ridge of the observer's nose provide three steadying points on the instrument.

Fig. 15 discloses the apparatus of Fig. 14 arranged to measure angle of sight. Arm A is clamped to arm C by means of clamp bolt 115 passing through holes in arms A and C. The instrument is aligned by aligning zero mark 116 on steadying device 108 with the zero mark of scale 117 on arm B and simultaneously moving the instrument until the bubble in spirit level 118 is in the level position. Mirror 119 on steadying member 108 furnishes a means for viewing the bubble in spirit level 118. The observer then sights on the distant target and notes the intersection of his line of vision with the scale on arm B.

Figs. 16 and 17 disclose a modification characterized by its simplicity, ease of manipulation and cheapness of construction.

Fig. 16 discloses the modified instrument arranged for range finding and measurement of horizontal angles. The arms A, B and C are clamped together in a similar manner as shown in Fig. 8 but the bolt $2d$ is anchored in arm C as the bolt $2a$ in Fig. 5. A block 120 is fixedly mounted on arm A and has projected thereon the zero mark of mil scale 11 on arm A. The slide 15 is adjustably mounted on arm A; also, arm B has the index line 21 thereon and cooperating mark 5 on arm C as in Fig. 1. A removable nail or peg 121 in arm C serves as a steadying device.

In this arrangement the mil scale 11 will not be visible to the observer when he is sighting and therefore the zero of that scale is projected on block 120. Aiming marks 16, 17 are movable along the edge of mil scale 11.

For angle of site measurements the apparatus is assembled as in Fig. 17. The observer places the cheek below his right eye against arm B and aligns zero line 122 on block 120 with the zero of the angle of sight scale on slide 15 and simultaneously levels the bubble in spirit level 123 carried on arm C. He then sights on the distant target and notes the intersection of his line of vision with the scale 124 on the slide 15. The slide 15 is clamped to arm A by means of a thumb screw 124 on an associated screw 125. Screw 125 is adapted to pass through hole 126 (Fig. 16).

It is understood that in the arrangements shown in the drawings, only those scales are shown which aid in explaining the operation of the instrument under discussion and it is understood that the actual number of scales which may be placed on the various members may and are more than those shown in any one particular figure; usually only one scale per figure is shown in order to avoid confusion in the mind of the reader.

I claim:

1. A range finding, horizontal angle measuring, and angle of site instrument comprising a trio of arm members pivotally connected together, one of said arm members providing means for holding the other of said arms a predetermined distance from the free end thereof, said free end having a slot therein, a bolt pivotally mounted in the slot the remaining arms of said trio being pivoted on said bolt, and clamping means on the free end of the bolt whereby said remaining arms may be clamped with their longitudinal axes perpendicular to the axis of said first member or parallel to the axis of said first member.

2. A range finding horizontal angle measuring and angle of site instrument comprising at least two arms connected together, one of said arms having a V notch adapted to receive the bridge of an observer's nose, and a steadying brace mounted on the last mentioned arm and adapted to engage at least one point on the observer's face, said steadying brace having an angle-of-site scale thereon and being adapted to be disposed on the instrument in angle-of-site reading relation.

3. A range finding, horizontal angle measuring, and angle of site instrument comprising at least a pair of arms connected together, one of said arm members having a V notch adapted to receive the bridge of the observer's nose, a steadying brace mounted on the last mentioned arm and having a V notch therein separating two surfaces on the brace which are adapted to engage points on the observer's face, and said last mentioned V notch providing a sight.

4. The same as in claim 3 and said last mentioned arm having a spirit level thereon, said steadying brace being mounted with its axis at an angle of substantially forty-five degrees to the last mentioned arm, and a mirror on the steadying brace.

5. A range finding, horizontal angle measuring and angle of site instrument comprising at least two arm members, one of said members providing means for holding the other arm member a predetermined distance from the free end of said holding member, a sighting member having aiming marks slidably mounted on said other arm member, an angle of site scale on the sighting member, and means for mounting the sighting member on the instrument in angle of site measuring relationship.

6. A range finding horizontal angle measuring and angle of site instrument comprising at least two arms connected together, one of said arm members having a V notch adapted to receive the bridge of an observer's nose, and a steadying brace adjacent said notch comprising two oppositely disposed members adapted to rest upon the cheeks and forehead between the observer's eyes.

7. A range finding horizontal angle measuring and angle of site instrument comprising at least two arms connected together, one of said arm members having a V notch adapted to receive the bridge of an observer's nose, and a steadying brace releasably mounted on the last mentioned arm and having a projection adapted to engage the observer's forehead.

8. A range finding horizontal angle measuring and angle of site instrument comprising at least two arms connected together, one of said arms having a V notch adapted to receive the bridge of an observer's nose, a steadying brace mounted on the last mentioned arm and adapted to engage at least one point on the observer's face, said steadying brace having an angle of site scale thereon and being adapted to be disposed on the instrument in angle of site reading relationship, and a spirit level mounted on said last mentioned arm and in close proximity to the V notch.

9. A range finding, horizontal angle measuring and angle of site instrument comprising at least two arm members, one of said members providing means for holding the other arm member a predetermined distance from the free end of said holding member, a sighting member having aiming marks slidably mounted on said other arm member, an angle of site scale on the sighting member, means for mounting the sighting member on the instrument in angle of site measuring relationship, and a spirit level mounted on said free end of said member.

10. An angle of site instrument comprising a substantially T-shaped instrument, the horizontal portion of said T having an angle of site scale thereon, a spirit level mounted on the vertical portion of said T, a mirror mounted on the instrument for reflecting the optical image of the spirit level bubble, and the free end of the vertical portion of the T being adapted to contact an observer's face.

11. A magnetic azimuth measuring instrument comprising a substantially T-shaped instrument, the horizontal portion of said T having a magnetic azimuth scale thereon, a magnetic compass needle mounted on the vertical portion of the T, a pair of abutments on opposite sides of one end of the needle, a mirror mounted on the instrument for reflecting the optical image of the pair of abutments and said needle end, the vertical portion of the T having its free end adapted to contact an observer's face, and means carried on the instrument for aligning the vision of the observer with a line having its axis passing through the center of said scale.

12. The same as in claim 11 and said last mentioned means comprising, a slit in the mirror and a wire having its axis passing through the center of the scale.

JOSEPH T. ZAK.